(12) United States Patent
Körner et al.

(10) Patent No.: US 7,876,446 B2
(45) Date of Patent: Jan. 25, 2011

(54) METHOD AND ASSEMBLY FOR CONFOCAL, CHROMATIC, INTERFEROMETRIC AND SPECTROSCOPIC SCANNING OF OPTICAL, MULTI-LAYER DATA MEMORIES

(75) Inventors: Klaus Körner, Schoneiche (DE); Reinhard Berger, Esslingen (DE); Ulrich Droste, Berlin (DE); Christian Kohler, Schwaigern (DE); Wolfgang Osten, Stuttgart (DE); Christof Pruss, Gerlingen (DE); Aiko Ruprecht, Wedel (DE); Tobias Wiesendanger, Rauenberg (DE)

(73) Assignee: Universitat Stuttgart (DE)

( * ) Notice: Subject to any disclaimer, the term of this patent is extended or adjusted under 35 U.S.C. 154(b) by 519 days.

(21) Appl. No.: 11/883,413

(22) PCT Filed: Feb. 3, 2006

(86) PCT No.: PCT/EP2006/000948

§ 371 (c)(1),
(2), (4) Date: Aug. 13, 2007

(87) PCT Pub. No.: WO2006/082067

PCT Pub. Date: Aug. 10, 2006

(65) Prior Publication Data
US 2008/0151253 A1    Jun. 26, 2008

(30) Foreign Application Priority Data
Feb. 3, 2005    (DE) ................ 10 2005 006 723

(51) Int. Cl.
   *G01B 9/02*    (2006.01)
   *G01J 3/45*    (2006.01)
(52) U.S. Cl. ............................ 356/456
(58) Field of Classification Search ........... 356/451, 356/456, 479, 497, 503–504; 369/94
See application file for complete search history.

(56) References Cited

U.S. PATENT DOCUMENTS 5,192,980 A  *   3/1993   Dixon et al. ............... 356/326

(Continued)

FOREIGN PATENT DOCUMENTS

DE    44 11 017 A1    9/1994
EP    0 731 459 A2    9/1996

OTHER PUBLICATIONS

"Interface microscopy for three-dimensional imaging with wavelength-to-depth encoding"—Guoqiang Li et al., Optics Letters—Oct. 15, 2000, vol. 25, No. 20, pp. 1505-1507.

(Continued)

*Primary Examiner*—Michael A Lyons
(74) *Attorney, Agent, or Firm*—Gerald E. Hespos; Michael J. Porco

(57) ABSTRACT

An interferometric confocal method and assembly for terabyte volume optical data memories couples two-beam spectral interferometry to chromatic confocal technology and permits a longitudinal splitting of foci in the memory volume, with the foci having limited diffraction. A spectrometer is located downstream of the interferometer with confocal discrimination in the beam path. A diffractive optical zone lens (DOZE) with a usage of the first diffraction order is introduced into the interferometric beam path to achieve longitudinal chromatic splitting. The interferometer can be a fiber-coupled interferometer with a retroreflector in the fiber-coupled reference arm and with wavelength-dependent optical path difference modification by dispersion or diffraction. The optical path difference in the interferometer is set so that easily detectable wavelets are formed from detectable interferograms by spectral analysis.

24 Claims, 4 Drawing Sheets

U.S. PATENT DOCUMENTS

| | | | |
|---|---|---|---|
| 5,526,338 A * | 6/1996 | Hasman et al. | 369/94 |
| 5,565,986 A * | 10/1996 | Knuttel | 356/456 |
| 5,619,371 A | 4/1997 | Pontius | |
| 5,784,352 A | 7/1998 | Swanson et al. | |
| 5,883,875 A | 3/1999 | Coufal et al. | |
| 6,072,765 A * | 6/2000 | Rolland et al. | 369/128 |
| 6,480,285 B1 * | 11/2002 | Hill | 356/492 |
| 6,819,491 B2 * | 11/2004 | Takahashi et al. | 359/566 |
| 7,054,062 B2 * | 5/2006 | Engelhardt et al. | 359/389 |
| 2006/0109483 A1 * | 5/2006 | Marx et al. | 356/609 |

OTHER PUBLICATIONS

"Chromatic confocal microscopy by means of continuum light generated through a standard single-mode fibre"—J. Garzon et al., Journal of Optics A: Pure and Applied Optics, 2004, pp. 544-548.

* cited by examiner

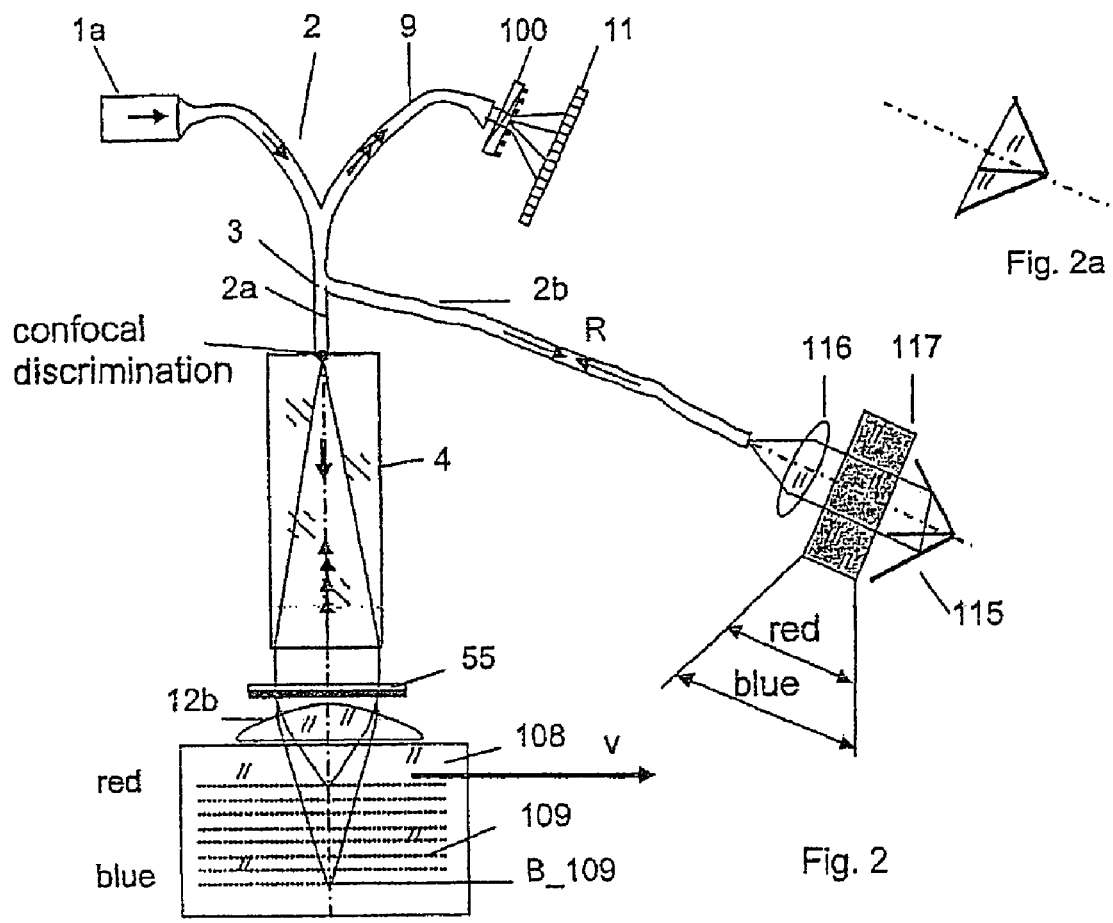
Fig. 2a
Fig. 2
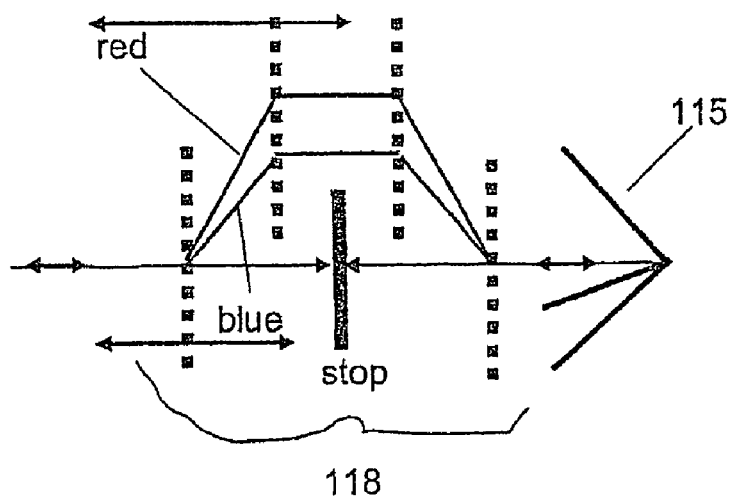
Fig. 2b

METHOD AND ASSEMBLY FOR CONFOCAL, CHROMATIC, INTERFEROMETRIC AND SPECTROSCOPIC SCANNING OF OPTICAL, MULTI-LAYER DATA MEMORIES

BACKGROUND OF THE INVENTION

1. Field of the Invention

The present invention relates to an interferometric confocal method, an interferometric confocal assembly for optical data storage devices, in particular terabyte volume storage devices, and a use of a data storage device.

2. Description of the Related Art

The read-out of data from a DVD can still take place at an excessively low speed even in modern real-time applications. For example if the intention is for simultaneous replay of a plurality of feature films with high picture quality from a single DVD. Moreover, there are increasingly applications where even the storage volume of a 17 Gbyte DVD is nowhere near adequate, for example in video archiving or data backup in the civil service and in databases where a very high data transfer rate is required.

The confocal technology, also in combination with interferometry, is well suited to the read-out of optical volume storage devices with multi-layers, also see Stephen R. Chinn and Eric A. Swanson: "Optical Coherence Tomography for High-Density Data Storage" in Handbook of Optical Coherence Tomography, Editors: Bouma, Brett, E.; Tearney, Guillermo, J.; Marcel Dekker, Inc., New York, Basel, 2002, ISBN number 0-8247-0558-0, [1] chapter 14, pp. 385-420. These principles are presented in U.S. Pat. No. 5,784,352 by Eric A. Swanson and Stephen R. Chinn.

The read-out of data by means of confocal technology can be effected in diffraction-limited fashion to a very good approximation. The confocal technology thus represents a very exploitable approach for further increasing the storage volume of optical volume storage devices. Problems with the signal quality can occur in the case of a very large number of layers arranged one above another, however, as a result of the scattering in the volume, particularly when reading from the deeper layers. There is an appreciable advantage with regard to sensitivity if the confocal technology is combined with an interferometric approach, that is to say that a confocal interferometric method is used, also see [1], p. 409. This advantage over the purely confocal technology also generally holds true for the detection of scattering centers in a larger depth in an unstructured transparent storage medium.

A further problem in the multi-layer technology is the spherical aberration in the storage medium, which greatly limits the usable depth region in the storage volume in the case of high-aperture fixed objectives; in this respect, also see [1], p. 408. Here it is explained that a fixed objective having a numerical aperture of 0.55 at a wavelength of 780 nm, despite post-focusing, owing to the spherical aberration, can only be used in a depth region of about +/−100 μm around the average focus position of 1.2 mm in the case of a standard polycarbonate disk without the occurrence of signal degradation as a result of wavefront deformations. This means that, owing to the influence of the spherical aberration, for example only about 10 layers can be read with good signal quality. In this case, with regard to the sensitivity, a confocal interferometric method—referred to as OCT system in [1], p. 409—could certainly read from 100 layers in the depth given suitable embodiment of the disk medium and layer configuration. However, this then requires an active optical arrangement for compensating for the spherical aberration, said active optical arrangement also being known as dynamic optical compensation. Said active optical arrangement increases the complexity of the scanning system to a very great extent, however, and considerably impairs the temporal dynamic characteristic of said system.

Moreover, the known approach of optical data read-out by means of confocal interferometric methods, also see [1], pp. 386-389, also referred to here as "optical coherence domain reflectometry", or OCT technology, only ever enables the read-out of a single layer or data track at one point in time, namely the read-out of the layer onto which the electromagnetic radiation is currently being focused for the read-out. Thus, it is not possible for a plurality of data tracks to be read simultaneously at one point in time and, consequently, the read-out speed is indeed very low in view of the very large quantity of data of a multi-layer data carrier that effects storage virtually in diffraction-limited fashion laterally.

White light interferometry with spectral evaluation, also known as Fourier domain OCT or spectral interferometry, also see M. W. Lindner, P. Andretzky, F. Kiesewetter and G. Häusler: Spectral Radar: Optical Coherence tomography in the Fourier Domain in [1], pp. 335-34.5, is likewise much better suited than the exclusively confocal technology to reading out a larger number of storage layers in the depth, owing to the comparatively good dynamic characteristic of the detectable signals. The problem, with regard to the read-out of optical volume storage devices by means of spectral interferometry, is the comparatively small numerical aperture of the focusing objective. Upon application of spectral interferometry for the optical data read-out from a storage medium, this would lead to laterally comparatively large dots or pits in the storage medium and hence to a significantly lower storage density per layer in comparison with the standard technology. This means that the economic benefit of this known approach for the optical data read-out is rather limited.

Independently of this, it has also already been proposed to read from a larger number of storage layers simultaneously in the depth and also laterally from a storage volume virtually in diffraction-limited fashion, solely by means of high-aperture confocal technology. However, purely confocal technology falls far short of achieving the sensitivity of the confocal interferometric methods, which, according to [1], p. 409, is two orders of magnitude better than that of the purely confocal technology.

Approaches for chromatic confocal microscopy have already been presented by H. J. Tiziani and H.-M. Uhde in the specialist article Three-dimensional image sensing by chromatic confocal microscopy in Applied Optics, Vol. 33, No. 1. April 1994, pp. 1838 to 1843. This approach enables the mechanical depth scan to be dispensed with. The read-out of optical data carriers was not of primary significance in these applications.

The publication "Accurate fiber-optic sensor for measurement of the distance based on white-light interferometry with dispersion" by Pavel Pavlicek and Gerd Häusler in ICO Tokyo, paper no. 15B3-1 on Jul. 15, 2004 [12], describes an assembly in which a signal that is intensity-modulated by way of the wave number is generated in a fiber in the reference arm of an interferometer by means of dispersion. However, here as well the object distance can only be determined within the physical-optical depth of focus of the sensor head, which is determined by the numerical aperture of the objective of said sensor head, and is therefore highly limited in particular for a high numerical aperture.

K. Körner, P. Lehmann, A. Ruprecht and W. Osten have also proposed a chromatic confocal assembly for reading optical data carriers. However, said assembly still has potential for improvement with regard to the sensitivity of the assembly.

Although holographic methods permit stored information to be read out from a volume, they generally have a non-diffraction-limited storage density and are therefore not considered any further here, also see [1], p. 386.

The aim of the invention is to make it possible, for commercial use, to read comparatively rapidly optical multi-layer data carriers, that is to say volume data carriers that are transparent in the base material with a very high storage density and storage capacity, for example also in the terabytes range. The aim in this case is to read from volume data carriers with a lateral storage density as near as possible to the limit due to the diffraction of electromagnetic waves and for the use of a focusing optical arrangement having the highest possible aperture, for example with a numerical aperture of at least 0.5. Moreover, the intention is to make it possible to obtain a comparatively high storage density in the vertical direction by virtue of the data layers lying comparatively close together as a result of the application of the invention. This is intended to become possible through the use of a focusing optical arrangement with a high numerical aperture. In this case, the intention is to make it possible to achieve a dataflow that is as large as possible by means of the inventive read-out method when reading from the volume data carrier, for example for simultaneous replay of a plurality of feature films with very high picture quality.

The aim of the invention is furthermore to achieve a comparatively high robustness toward vibrations during the read-out operation and smaller manufacturing faults of the data carrier. The aim is furthermore to dispense with an active optical arrangement, at least in the read-out operation, in particular in order to achieve a high read-out speed and comparatively low production costs and also a long product service life.

A further aim is also to be able to read data carriers which have a very good long-term stability of the data storage. These data carriers are then likely to have a lower storage capacity. Therefore, the intention is also to make it possible to apply the method also to storage materials which, in the event of wear, destruction or weathering of the surface of the optical data carrier, make it possible as necessary to repolish the optical contact area thereof. Upon application of the invention the intention is for example to make it possible also to read dots "burnt" by means of femtosecond lasers, in different depths of the storage volume, for example also dots in high-strength inorganic and transparent materials.

Thus, the inventive object to be achieved is therefore in particular that of simultaneously detecting optical features very rapidly and with high reliability when reading out data from an optical data storage device also in significantly more than two layers in the depth or in volume regions of different depths.

Furthermore, the inventive object to be achieved is therefore also that of achieving a high robustness in the read-out operation by virtue of the fact that the read-out system, that is to say the optical sensing head, can still supply data comparatively reliably at the point in time of the read-out even when it is in a certain incorrect position in the depth.

SUMMARY OF THE INVENTION

The application of the invention is envisaged primarily for the optical read-out from read only memories, but is in no way restricted to this application.

In this case, the invention can be applied both to a previously structured storage volume, that is to say one having a defined number of storage layers, for example 8, 16, 64 or 128 storage layers, but also to a spatially rather unstructured transparent volume of the storage device.

A data layer which is intended to be read by means of the inventive assembly can be constructed for example with pits having a depth corresponding to an optical path difference of one quarter of the wavelength used. This is standard in modern optical data storage devices, also see [1], p. 388. However, the data pits can also be microscopically small regions with reflectance differences in the transparent storage material as a result of a change in the refractive index, or else microscopically small scattering centers or reflection centers which can be detected optically.

The inventive interferometric confocal method proposed here for optical data storage devices, preferably for writing to and/or reading from optical data storage devices, in particular terabyte volume storage devices, and also for the simultaneous read-out of a plurality of channels, combines according to the invention the known, preferably conventional chromatic confocal technology for depth detection or 3D detection, also referred to as chromatic confocal microscopy (CCM), which involves effecting a longitudinal splitting of the foci in the storage volume by means of a longitudinal chromatic aberration, with the known, preferably conventional white light interferometry (WLI) with preferably conventional spectral analysis, also known as Fourier domain WLI, Fourier domain OCT or else as spectral interferometry, in particular two-beam interferometry.

The inventive interferometric confocal method for optical data storage devices, in particular terabyte volume storage devices, and also for simultaneous read-out of a plurality of channels, is referred to hereinafter as chromatic confocal spectral interferometry (CC-SI) or else chromatic confocal two-beam spectral interferometry. In this case, a rather broadband source of electromagnetic radiation in comparison with a laser is used and an interferometer and a receiver of electromagnetic radiation are used. According to the invention, a spectrometer is disposed downstream of the interferometer. Said spectrometer is disposed upstream of the receiver of electromagnetic radiation.

In the case of the inventive interferometric confocal method for optical data storage devices, in particular terabyte volume storage devices, and also for simultaneous read-out of a plurality of channels of optical volume storage devices, it is possible to use a single multi-wavelength source of electromagnetic radiation or else a larger number of multi-wavelength sources. The multi-wavelength sources can be formed in point-type fashion, or one or a plurality of point-type multi-wavelength sources is or are represented by means of fibers or micro-diaphragms. There is arrangement of an interferometer. The storage medium is illuminated by means of a focusing system, the focusing system being part of the interferometer. Moreover, a microscopic imaging of the interior of the volume storage device, or of the storage medium, is also effected by means of the focusing system. The method can be carried out using reflected light or else using transmitted light. The reflected light approach is of primary significance in the rest of the description. The interior of the volume storage device, or of the storage medium, is imaged onto a screened receiver of electromagnetic radiation, said receiver having a high temporal resolution, a spectrometer being disposed upstream of the screened receiver. Said spectrometer can be fiber-coupled.

According to the invention, therefore, the chromatic confocal microscopic technology is combined from a method standpoint with spectral two-beam interferometry, that is to say that a chromatic confocal microscopic method and a spectral two-beam interferometry method are coupled to one another. In this case, the interferometer works with an optical path difference not equal to zero, that is to say that the interferometer is operated in such a way that an optical path difference of the interfering electromagnetic radiation is other than zero. In the case of a reflective region or dot in the storage medium, at least one wavelet is generated over the spectral axis. The term "dot" and the term "reflective region" are preferably used essentially synonymously. In this case, wavelet is understood here to mean a signal which is periodic, wherein the frequency or the period length can also change, and the signal has an upper envelope, that is to say is modulated over its profile. In this case, the upper envelope of the signal can have a maximum.

In other words, one aspect of the present invention relates to a method for writing to and/or reading from a data storage device, in particular a terabyte volume storage device, comprising the steps of: radiating electromagnetic radiation from at least one multi-wavelength source onto the data storage device, imaging reflected or transmitted electromagnetic radiation on a screened receiver, after the electromagnetic radiation has passed through a two-beam interferometer, a chromatic confocal microscope and a spectrometer, wherein an optical path difference not equal to zero is present in the interferometer, and in the case of a reflected region or a dot in the data storage device, at least one wavelet is generated over the spectral axis of the spectrometer.

Preferably, in the case of the interferometric confocal method for optical data storage devices, in particular terabyte volume storage devices, the signal amplitude of wavelets is evaluated in order to obtain digital data. Preferably, the phase or the full width at half maximum of the envelope can also be evaluated. However, this requires a more complex computation method than the calculation of the signal amplitude of wavelets, wherein the latter only have to be calculated approximately in order to decide whether a logic zero or logic 1 is present. Therefore, the calculation of the signal amplitude of wavelets is favored here.

Preferably, in the case of the interferometric confocal method for optical data storage devices, in particular terabyte volume storage devices, logical scanning windows are formed which from the sensor elements of the spectrometer which evaluate a wavelet in each case—that is to say on the spectrometer axis. As a result of external influences on the scanning head, said wavelets can "drift or even jump on the spectrometer axis from one data detection instant to the next". Preferably, therefore, said logical scanning windows are electronically tracked to these drifting wavelets in a highly dynamic manner in the read-out operation. In this case, it is possible to perform a trend analysis for the shift in a highly dynamic manner. This is possible since the logical scanning window is designed to be somewhat wider than is absolutely necessary for the evaluation of the wavelets. This makes it possible to track logical scanning windows even in the case of "jumping wavelets" on the spectrometer axis, for example owing to a violent impact on the overall system with an acceleration component in the depth, in order to achieve a reliable read-out of the data from the storage volume. Since this tracking can be effected without any mechanical component, this approach is far superior to the approaches that work with mechanically positioning components.

In this case, upon application of the inventive chromatic confocal spectral interferometry for optical data storage devices, in particular terabyte volume storage devices, the optical focusing system is therefore used to effect both an illumination and a microscopic imaging of the interior of the volume storage device (which is transparent in the base material), that is to say in different depths simultaneously. By means of a longitudinal chromatic aberration in the optical focusing system of the scanning head, the foci are separated preferably and at least approximately along a straight line in the volume of the transparent data storage device. Foci are therefore formed by longitudinal chromatic aberration, or chromatic depth splitting, in different depths of the storage medium. In this case, the spherical aberration is made to a minimum for each focus of any desired wavelength in the spectral range used, such that to a good approximation a diffraction-limited imaging exists for the focal spot in each depth of the storage medium that is taken into account by the design of the scanning system.

In this case, the interferometer can be of the Michelson type, or of the Linnik type or else of the Mach-Zehnder type. However, the two-beam interferometer can also be configured as an at least partly formed common-path interferometer. The two-beam interferometer can then also be formed as a Fizeau interferometer or else as a Mirau interferometer.

In this case, the data carrier can have a relative movement at rather high speed with respect to the scanning head, for example as in the case of storage disks running at high speed.

However, it is also possible to configure, with regard to volume and quantity of data, comparatively very small volume storage devices composed of wear-resistant, chemically highly resistant inorganic material.

These can serve in particular for the long-term-stable identification of objects or of animals. These volume storage devices have—for example for the long-term storage of data regarding name, origin and date of birth and also letter or number keys—preferably a number of densely packed, partly transparent layers, which number is unambiguously defined in the depth, wherein a logic 1 is assigned to the presence of a layer and a logic 0 is assigned to the absence of a layer. It is thus possible for example to store a quantity of data of 16 bytes stably over the long term.

In the case of animals, it is also possible to arrange a plurality of volume storage devices in the tooth or skeleton region as invisible, virtually indestructible and captive implants. Said implants can also be formed with a sealing.

When reading from this volume storage device, the scanning head performs only a microscopically small lateral or else even no relative movement with respect to the volume storage device. The latter option is possible if, preferably in each depth of the volume storage device, each layer in the extreme case is intended to carry only one bit of information. The advantage in this case is the particularly fast identification after the optical coupling of a miniaturized scanning head using comparatively simple means, for example in comparison with a DNA analysis. The optical coupling of the scanning head to the storage medium can also be effected by means of immersion liquid in order to greatly reduce the requirements with regard to the roughness of the storage medium interface.

Furthermore, it is preferably possible to effect an optical marking of the end piece preferably of multimode fibers, for example composed of quartz, by means of laser-burnt dots in the depth of a few 10 µm, which were produced by means of a Femto second laser. The transmission of the fiber is influenced only insignificantly in this case.

Furthermore, in the optical focusing system of the optical scanning head, the longitudinal chromatic splitting of the foci in the object space can be effected in various ways with a longitudinal chromatic aberration that is quantified exactly in the optical design of the focusing system: firstly by a special chromatic embodiment of a purely dispersive focusing optical arrangement, or secondly by a dispersive focusing optical arrangement with a rather low longitudinal chromatic aberration, but additionally with at least one diffractive optical element, that is to say by a hybrid system, where the diffractive optical element is used in a diffraction order other than zero, or thirdly by the embodiment of the focusing optical arrangement as a purely diffractive system, wherein here as well the diffractive optical element is used in a diffraction order other than zero.

In this case, the magnitude of the longitudinal chromatic aberration of the focusing optical arrangement of the wavelength range used for the data read-out is set in such a way that a depth splitting of the foci is carried out which corresponds at least to the desired scanning depth in the volume of the data storage device. Furthermore, the spectral range used is adapted to the spectral resolution of the spectrometer used. The advantage of the principle of longitudinal chromatic aberration or longitudinal chromatic splitting of the focusing optical arrangement is that even in the event of a shift of the scanning head in the depth in the event of an impact on the system, light can nevertheless form a focus sharply on a data layer at the point in time after the impact—but with a somewhat different wavelength and before the impact. The evaluation processors, which preferably evaluate the light of all the wavelengths in the spectral range used, identify this change in the wavelength of the focused light.

In this case, in the specification light is always used in the broadly formulated sense of electromagnetic radiation in the UV, VIS or infrared range.

This means that in the scanning system there is always light of specific wavelengths which is currently being processed further digitally, and light of specific wavelengths which is currently not being processed further at a point in time.

The diffractive optical element can in this case preferably be formed as a positive or negative zone lens. There are technical arguments in favor of both variants. Long-wave light usually penetrates somewhat better through a storage material, for example. This reason supports a negative zone lens. By contrast, short-wave light is influenced less by diffraction at small openings, that is to say can readily reach even more deeply situated layers in the storage material. This is support more in favor of a positive zone lens.

The diffractive optical zone lens can also be produced by a spatial light modulator (SLM), the refractive power of which can be set in variable and computer-controlled fashion, that is to say in predetermined fashion.

In order to be able to simultaneously read a plurality of tracks laterally in a layer, the zone lens is preferably arranged in the Fourier plane of the focusing objective, where the pupil of the optical focusing system is also situated, which results in a telecentric beam path in the storage volume and hence an imaging scale that is independent of the wavelength. This is highly advantageous for the read-out of layers of different depths and also constitutes the practical prerequisite for being able to simultaneously read both a plurality of layers lying alongside one another and a plurality of layers in the depth.

The coherent reference wave required in each case for interference is preferably obtained by means of a reference beam path of a fiber-coupled Michelson interferometer, of a fiber-coupled Linnik interferometer or else of a Mach-Zehnder interferometer.

The use of the Mach-Zehnder interferometer permits the use of the second interferometer output, which operates at least approximately in antiphase. Thus, by subtraction of the signals obtained by means of the two interferometer outputs, the signal amplitude can be doubled and the DC component can be eliminated. This improves the signal-to-noise ratio and hence the reliability of the data evaluation.

In this case, preferably a miniaturized collimator and a retroreflector are disposed downstream of the fiber end in the reference beam path of the interferometer. Thus, in a first case, the required optical path difference of the interferometer can be tuned by the retroreflector being shifted once during the production of the scanning head. Said retroreflector is preferably formed as a miniaturized, generally glassless triple-mirror reflector. The collimator must be achromatized well. In this case, all the layers can be read simultaneously, for example 16 layers.

Reflective regions of a data layer therefore supply wavelets that can be evaluated, while pits with a depression corresponding to an optical path difference of one quarter of the wavelength used do not supply any wavelets. Therefore, preferably the signal amplitude of the wavelet or a value derived from the signal amplitude is evaluated, and not the phase of the wavelet. By means of a threshold for the calculated signal amplitude A or a value derived from the same, 1 or 0 is decided. In this case, owing to the confocal discrimination, however, only light, or electromagnetic radiation, which forms a focus which is situated in each case in the physical-optical depth of focus range symmetrically surrounding a data layer is evaluated to give a digital information item. Light of wavelengths which form a focus which lies more than the physical-optical depth of focus away from a data layer is consistently excluded from the processing to form digital data.

In this case, by balancing five intensities $I_1$ to $I_5$ from directly adjacent sensor elements which have a phase difference of at least approximately 90° with respect to one another, it is possible to use for example the following known equation for determining the signal amplitude A:

$$A = \sqrt{(I_1 - 2I_3 + I_5)^2 + (2I_2 - 2I_4)^2}. \tag{1}$$

Other equations for determining the signal amplitude A are known and can likewise be employed. This calculation of the signal amplitude A can be performed extremely rapidly by means of hardware processors which access the sensor elements in parallel. In order to accelerate the calculation further, instead of the radicands it is also possible to add the magnitudes of the bracket contents, which at least approximately supply the value for the signal amplitude A.

In the simplest case, for identifying a wavelet it is also possible to evaluate the differences in the signals of sensor elements of a spectrometer line which lie directly alongside one another. If said differences repeatedly exceed a threshold, in which case averaging of said signals is also possible, a wavelet is present. The latter arises as a result of a reflection at the layer, and for example the presence of a wavelet is identified as logic 1.

However, the signal amplitude can also be calculated over a larger number of intensities from directly adjacent sensor elements by means of FFT, wherein the FFT is preferably performed piecewise over the spectral range, namely where a wavelet is expected and the piece evaluated on the spectrometer line preferably corresponds at most to about half the distance between two wavelets. Sub-Nyquist methods can also be employed for calculating signal amplitudes since the expected frequency is at least approximately known.

In the case of a very high-aperture focusing object, for example having a numerical aperture of 0.8 and a particularly large number of layers arranged one above another in the storage volume, for example in the case of 128 layers, the greatly changing periodicity over the wavelength in the wavelets can constitute a considerable problem for the simultaneous detection of the same. On the other hand, the simultaneous evaluation of 4, 8 or 16 layers, for example, which then constitute a layer packet, generally suffices. In this case, it is additionally also possible for a plurality of layers lying alongside one another to be scanned in order to enable a particularly large dataflow.

In this second case, the retroreflector is formed such that it can be regulated sensitively in terms of its axial position in order always to set the optical path difference in the interferometer to be somewhat different from zero with respect to the depth of the layers of the selected packet. According to the desired layer packet, therefore, the regulation results in the retroreflector moving to an axial position which leads to a readily evaluatable frequency over the wavelength in the wavelet, for example if the phase difference between two regions of the wavelet—which are scanned by directly adjacent sensor elements—is at least approximately 60-120 degrees. Since different layer packets always also have a different wavelength range in the case of the invention, by changing the position of the retroreflector it is also possible to switch on a different light source, that is to say a different superluminescence diode (SLD), for example, which belongs to a switchable multi-SLD light source. In this case, the spectrum of the SLD respectively switched on fully covers the required range for the packet. This inventive approach with the axially tracked retroreflector has great potential for the data read-out in order to read a particularly large number of layers in the depth since the axial tracking of the retroreflector always permits a good adaptation of the frequency of the wavelets over the wavelength to the resolution of the spectrometer.

It is preferably also possible that the coherent reference wave respectively required is formed from a wavefront that arises upon transmission or reflection in the zeroth diffraction order at the diffractive optical zone lens. A common-path beam path can thus be achieved. In this case, said zone lens is assigned an at least partly reflective reference mirror area in the common-path beam path, which serves for reflecting the at least approximately well focused reference waves of all wavelengths. The reference beam path is formed in achromatic fashion. This means that the dispersive part of the focusing system must preferably be well achromatized. This approach is very compact and volume-saving, but is suitable for a rather smaller number of layers and for a rather not extremely high numerical aperture owing to the problems with eliminating the spherical aberration in the common-path beam path both for object and reference. By way of example, in this case there can be an optimum for only 16 layers in the storage volume and a numerical aperture of about 0.55.

When a diffractive optical system is formed with one, two or more zone lenses for longitudinal chromatic splitting in a comparatively large pupil of the focusing system, which is preferably arranged in the Fourier plane of the latter, it is also possible to achieve a higher numerical aperture than 0.55 for the focusing system. In this case, however, a sufficiently good correction of the spherical aberration, also known as aperture aberration, must be effected by means of the diffractive optical system in the pupil for the chromatic beam path—and this must be done for the entire spectral range used. In this case, as a result of the longitudinal chromatic aberration produced in predetermined fashion, or the chromatic depth splitting, the foci form in different depths of the storage medium, wherein the spherical aberration has a minimum for each focus of any desired wavelength in the spectral range used, such that to a good approximation a diffraction-limited imaging exists for the focal spot in each depth of the storage medium that is taken into account by the design of the scanning system.

Furthermore, in the optical system, by means of bundle-limiting means, a confocal discrimination is always carried out for the wavefronts coming from the storage medium, in order to avoid crosstalk from other layers. This can be done through the end of a monomode fiber or micro-diaphragms.

Furthermore, in the case of the inventive interferometric confocal method for optical data storage devices, in particular terabyte volume storage devices, wavelets are preferably generated which are influenced in terms of their form and frequency by virtue of the fact that in at least one arm of the interferometer, the optical path difference is made wavelength-dependent. This is highly advantageous for a fast evaluation of the wavelets on the spectrometer axis, in particular when the very large number of layers are to be evaluated in the depth. In this case, for an interferometer without wavelength-dependent path difference adaptation, the form and frequency of the wavelets change to a comparatively great extent owing to the comparatively large depth region, for example by more than 500 μm. This can lead to a variation of the frequency of the wavelets which is unsuitably large for the fast evaluation. The spectrometer line would then have to have sensor elements with a variable spacing or a very large number of sensor elements is required, which in turn make an extremely fast evaluation more complicated. The wavelength dependence over the path difference is set in such a way that it produces, with the respective wavelength, a variation of the frequency of the wavelets on the spectrometer axis, or spectrometer line, which changes little overall. By way of example, 3 to 6 sensor elements are preferably thus assigned to each period under the envelope of the wavelet. In the case of a sub-Nyquist evaluation and a wavelength-dependent path difference that is optimized in the interferometer, it is also preferably possible for 4/3 sensor elements to be computationally assigned to each period under the envelope of the wavelet, which leads to a comparatively small number of sensor elements. In this case, however, the sensor elements should have a filling factor in the direction of the spectrometer axis of at most 50% in order to achieve a high signal modulation, which means a non-efficient use of the light energy used.

Furthermore, in the case of the inventive interferometric confocal method for optical data storage devices, in particular terabyte volume storage devices, wavelets are preferably generated with form and frequency adaptation. This means: for light of different wavelengths it is necessary to generate a varying optical path difference in the interferometer. Therefore, at least in one arm of the interferometer, the optical path difference is made wavelength-dependent in predetermined fashion. Preferably, in this case, in the reference arm of the interferometer, the optical path difference is made wavelength-dependent and preferably settable in computer-controlled fashion. Thus, an adaptation of the frequency and, if appropriate, also of the form of the envelope of the wavelets over the wavelength, that is to say on the spectrometer line, is effected and thereby technically facilitates the extremely fast identification and evaluation of the wavelets. The aim in this case is the least possible variation of the frequency of the wavelets. This predetermined setting of the dependence of the optical path difference on the wavelength can thus make it completely superfluous to axially readjust the retroreflector when changing the layer packet to be read.

The setting of the dependence of the optical path difference on the wavelength can be produced in the interferometer by means of dispersion, but also by means of diffraction or by means of a combination of the two. This can be brought about simultaneously in both interferometer arms or else only in one respective arm, wherein the optical imaging system can also already introduce dependence of the optical path difference on the wavelength somewhat, but generally to a rather small magnitude.

Furthermore, it is also preferably possible for the dependence of the optical path difference on the wavelength to be used in the opposite sense to that described above, to be precise in such a way as to produce for the wavelets on the wavelength axis a—preferably by means of FFT—characteristic and readily evaluatable shift in the center frequency of the wavelets, that is to say the change in the center frequency of the wavelets from one wavelet to the next. This altered center frequency is used according to the invention preferably to identify unequivocally the identity of a wavelet. However, this application is regarded as advantageous rather for specific applications. In this case, a continuously falling or continuously rising center frequency—which is concomitantly induced in a targeted manner by the dependence of the optical path difference on the wavelength—of the wavelets is preferably generated. This dependence of the optical path difference on the wavelength is based on the principle of the dispersion and/or diffraction in at least one of the two arms of the two-beam interferometer. Since the frequency variation given efficient use of the sensor elements, owing to the sampling theorem, is generally possible only in a rather limited scope, unless when sub-Nyquist methods are employed, this approach will be able to be used rather for a limited number of layers and hence wavelets to be evaluated. By means of the rapid determination of the average frequency of the wavelets, for example by means of FFT processors, trends in the overall system, for example changes in the distance of the focusing optical arrangement with respect to the volume storage device or variations in the layer spacing, can also be identified very well and hence also corrected.

It is also possible, however, to employ the inventive interferometric confocal method for optical data storage devices, in particular terabyte volume storage devices, preferably in the case of a rotating thin low-cost disk storage device having preferably only a single data-carrying layer and to use only the robustness toward changes in the depth position of the data-carrying layer. Use is envisaged here in particular also in the case of electronic toys and for optoelectronic identification of products. An axial scan of the focusing system can be completely dispensed with here through the application of the invention since a scanning focal spot is available for each depth position. In this case, the changes in the depth position can be caused for example by an undulating topography of the surface of said low-cost disk storage device, or by a wobble of the disk storage device on account of a poor rolling-element bearing or else by a somewhat undulating data layer. The variation of the depth position of the data-carrying layer can then on the spectrometer axis to a "jumping wavelet", which, however, can be reliably detected by means of fast processors in a comparatively large range. The storage medium can be a thin, for example adhesively bonded, plastic film which is read for example in a depth of about 20 µm. With the arrangement of lined data pits on the data-carrying layer, the lateral scan for reading the memory can also be effected manually, if appropriate, the scanner preferably being placed mechanically onto the plastic film. Generally, the read-out of lined data pits can be effected, however, by means of an optomechanical 1D lateral scanner, comparable to a barcode scanner. The light source used in this application may be an SLD, which may have a spectral full width at half maximum of 50 nm to 100 nm, for example, at approximately 700 nm.

A further aspect of the present invention relates to an interferometric confocal assembly for optical data storage devices, in particular for writing to and/or reading from optical data storage devices, in particular terabyte volume storage devices, using reflected light or else using transmitted light, comprising an interferometer and comprising a multi-wavelength source of electromagnetic radiation or a multiplicity of multi-wavelength sources, and comprising microscopic imaging of the interior of the volume storage device by means of a focusing system, which is arranged in the interferometric beam path, onto a screened receiver of electromagnetic radiation; according to the invention, the interferometer is coupled to a chromatic confocal arrangement in the imaging beam path of the focusing system, wherein a spectrometer is disposed upstream of the screened receiver. In this case, no chromatic confocal components are arranged in the reference beam path. In other words, the reference beam path is preferably free of chromatic confocal components. In this case, the interferometer is preferably formed as a two-beam interferometer.

Assuming a separation of the data layers in the depth of the storage medium in order to minimize crosstalk, for example the value of ten times the full width at half maximum FWHM of the confocal signal, which follows as is known from the respective wavelength λ and the aperture angle α of the numerical aperture sin α of the focusing system with equation (2) for the refractive index n $$FWHM = \frac{0.45\lambda}{n(1 - \cos(\alpha))}, \quad (2)$$

a separation of the data layers in the depth of the order of magnitude of 10 µm results in the case of focusing systems having a high numerical aperture NA>0.65 and in the case of electromagnetic radiation in the VIS range. This may already suffice to largely preclude the known crosstalk. The absolute minimum for the layer spacing may be approximately 3 to 5 full widths at half maximum of the confocal signal, also see equation (2), which, in the blue or violet spectral range, including the UV range, may enable layer spacings of a few micrometers. However, this must also always be considered in connection with the algorithmic procedure used for evaluating the optical data and the very small production tolerances of the storage medium that are to be complied with in this case.

Given a separation of the data layers in the depth of approximately 10 µm, for example 16 layers can be accommodated in a depth region of the storage medium of approximately 0.2 mm in the case of a focusing system having a numerical aperture of approximately 0.7 when using the VIS range. In this case, the spacing of the layers may perfectly well be formed to be somewhat variable over the depth.

In this case, it is necessary to meet the following conditions for the generation of signals that can be evaluated reliably:
1. The distance between the focusing system and the optical interface of the storage medium and also the refractive index and the dispersion of the storage medium have narrow tolerances.
2. The optical design of the focusing system is preferably implemented, with regard to the storage medium having narrow tolerances, such that when forming focal spots of any wavelength of the electromagnetic radiation used for the read-out in the storage volume, the spherical aberration is made sufficiently small in order that focused electromagnetic radiation that is scattered or reflected in each depth of the storage medium can supply a wavefront having sufficiently little aberration, which can thereby attain, with a reference wave generated in coherent fashion in the interferometer, interference that can be evaluated sufficiently well in terms of signal technology.

Given sufficiently small spherical aberration in the focusing system for all wavelengths used, a sufficiently well modulated interference signal can also be formed for all focal spots—separated in each case at least approximately along a straight line in the depth of the storage medium by chromatic depth splitting—which are reflected or scattered. The at least approximate elimination of spherical aberration for all wavelengths used makes it possible to overcome the known problem of the very greatly limited read-out depth region of, for example, only +/−100 µm in the case of high-aperture focusing systems, e.g. in the case of a numerical aperture of 0.55 and a light wavelength of 780 nm on account of the spherical aberration without the use of an active optical arrangement. The uncompensated system enables the read-out of only about 10 layers.

In the case of the inventive approach, therefore, for each wavelength, preferably, the spherical aberration is already made sufficiently small by the design of the longitudinally chromatically splitting focusing system, such that a sufficiently large read-out depth region can be achieved. The latter may be for example +/−300 µm in the case of a numerical aperture of 0.7, whereby in the VIS range 32 layers can perfectly well be read simultaneously and with high reliability.

With the use of a white light continuum source, for example a white light continuum laser, and a sensor line having a high number of sensor elements, the sensor elements of which are read in parallel and hence very rapidly, the requirement for the precise distance positioning of the scanning head can be relaxed somewhat since a focal spot always impinges on a pit or dot of a specific data layer, even if the wavelength of the in each case at least approximately diffraction-limited focal spot for said data layer or depth can thereby vary somewhat. The wavelength of the focal spot is therefore flexible within certain limits. However, that considerably improves the robustness of obtaining data toward production tolerances of the storage medium and toward vibrations.

The interference signal is preferably evaluated by means of a grating spectrometer having preferably at least one very fast photodiode line which can supply signals that can be evaluated in the microseconds range or else in the sub-microseconds range and has a high sensitivity. Given a sufficiently strong light source, it is preferably also possible to use a fast CMOS line camera. In this case, the line sensor, that is to say the spectral axis, represents the λ axis, where λ represents the wavelength of the electromagnetic radiation. The chip of the photodiode line or else of the CMOS line camera can also have an intelligence-on-chip functionality. With a parallel axis to the individual sensor elements, an extremely fast evaluation of the spectra, that is to say here of the wavelets, can thus be carried out by means of hardwired processors.

For each depth of a data carrier layer in the storage medium or for each dot lying at any depth within the evaluatable region of the storage medium, therefore, there is light of a precisely matching wavelength, which forms a focus precisely there, such that an at least approximately diffraction-limited focal spot can always be formed, wherein the wavelength of the light can vary somewhat. Precisely in this wavelength range, a wavelet in each case arises on said line sensor, wherein the precisely matching wavelength at least approximately forms the centroid wavelength of the wavelet. At the minimum, three sensor elements with a suitable lateral spacing suffice to identify the existence of a wavelet having an at least approximately known frequency. It is better, however, to use four to eight sensor elements having a suitable lateral spacing in order to reliably identify the existence of a wavelet having an at least approximately known frequency. It is advantageous in this case if the phase difference between two regions of the wavelet which are scanned—by directly adjacent sensor elements—is at least approximately 90 degrees.

In a case where the distance of the sensing head does not have such narrow tolerances, the sliding center wavelengths of the wavelets therefore also occurring as a consequence, there is preferably at least one, generally a plurality of unstructured and reflective reference layer(s) in the storage medium, for example on the base thereof, in order to reliably enable the assignment of the wavelets to the individual layers.

On the other hand, a data storage device can also be constructed with a large number of storage disks, wherein each side of a disk is preferably assigned a complete focusing system in each case. This is particularly simple by means of the application of the invention since the axial scan in the focusing system can thereby be dispensed with.

In the case of an interferometric confocal assembly for optical data storage devices, in particular terabyte volume storage devices, the diffractive optical zone lens can be arranged in the pupil in the remote focal plane of the focusing objective. The numerical aperture of the light of all wavelengths is thus identical. However, the pupil can also be made somewhat larger for longer-wave light by means of a chromatic filter having radial dependence, also known as chromatic apodization, since the diffraction-limited lateral extent for foci of longer-wave light can thus be matched to that of the shorter-wave light.

By way of example, a white light continuum laser or one or a plurality of fiber-coupled superluminescence diodes is or are used as the white light source.

Furthermore, preferably at least one additional reference layer is arranged in the storage medium. Said layer serves for unambiguous spatial structuring of the storage volume in the depth during the scanning with a somewhat sliding wavelength owing to a distance between the optical scanning head and the surface of the storage medium which does not have very narrow tolerances, or as a result of production inaccuracies of the storage medium.

Furthermore, in the case of the interferometric confocal assembly according to the invention for optical data storage devices, in particular terabyte volume storage devices, a fiber-coupled line spectrometer is preferably disposed downstream of the interferometer.

Furthermore, in the case of the interferometric confocal assembly according to the invention for optical data storage devices, in particular terabyte volume storage devices, preferably at least one optical element is arranged in the collimated reference beam path with dispersive material. This enables a path difference adaptation for adapting the frequency of the wavelets over the wavelength and can make it superfluous to axially readjust the retroreflector upon the change of the layer packet.

Furthermore, in the case of the interferometric confocal assembly according to the invention for optical data storage devices, in particular terabyte volume storage devices, the optical element with dispersive material in the collimated reference beam path is preferably formed as a plane-parallel plate.

Furthermore, in the case of the interferometric confocal assembly according to the invention for optical data storage devices, in particular terabyte volume storage devices, a diffraction module with gratings can preferably be arranged in the collimated reference beam path.

Furthermore, in the case of the interferometric confocal assembly according to the invention for optical data storage devices, in particular terabyte volume storage devices, the diffraction module can preferably be constructed by means of two or else four structurally identical phase gratings that are all arranged parallel to one another. Said phase gratings can be formed as phase-mostly SLMs. Said SLMs are preferably formed such that they can be controlled electronically in terms of their grating parameters.

For the interferometric confocal assembly according to the invention for optical data storage devices, in particular terabyte volume storage devices, it may be advantageous to meet the following first condition.

The average optical path difference in the reference arm of an interferometer is preferably intended to be set such that—when a bundle having the wavelength $\lambda+\Delta\lambda$ impinges on a reflection element of the data layer—a change in the phase of at least approximately $\pi/2$ results in comparison with a bundle having the wavelength $\lambda$ which impinges on the same reflection element, the light having the wavelength $\lambda+\Delta\lambda$ being detected by the adjacent sensor element of the spectrometer. Thus, a period of the wavelet under the envelope can already be scanned very well by means of four sensor elements and the signal amplitude can be determined. This setting of the optical path difference can be effected for example by means of an axially displaceable retroreflector in the reference arm of the interferometer.

Furthermore, in this case the following second condition is preferably intended to hold true for a focusing system having a high numerical aperture.

The focus formed by a wavelength $\lambda+\Delta\lambda$ in the storage medium, while $\Delta\lambda$ represents the spectral element resolved by the spectrometer, should preferably lead in the storage medium to a shift of the focus position in the depth of $n\lambda/30$ at the minimum and maximally of $n\lambda/3$, where n represents the refractive index of the storage medium. This ensures that enough sensor elements can detect a modulated signal under the envelope of each wavelet, in which case this estimation must always also be seen in connection with the full width at half maximum of the confocal signal and the layer spacing and also the number of available sensor elements of the spectrometer. Furthermore, for energetic reasons, $\Delta\lambda$ should be chosen such that it is as far as possible not much less than 0.05 nm.

For light bundles having the wavelength of $\Delta=600.0$ nm and a path difference $\Delta x$ of 450 μm in the interferometer, with equation (3)

$$\phi=2\pi\cdot\Delta x/\lambda \quad (3)$$

a phase difference $\phi$ of 1500 $\pi$ results. The sensor element i of the spectrometer at the wavelength 600.0 nm therefore detects an interference signal with the variable phase term $\phi i$ of 1500 $\pi$. The spectrometer is intended to resolve 0.2 nm, that is to say the two adjacent sensor elements i and i+1 detect light of wavelengths which differs by 0.2 nm in wavelength. For a light bundle having the wavelength of $\lambda=599.8$ nm, an interference signal with a phase difference $\phi$ of 1500.5 $\pi$ then follows, so that the adjacent sensor element i+1, which detects the interference signal having the wavelength of $\lambda=599.8$ nm, then registers a signal value shifted by $\pi/2$ or 90 degrees relative to that of the sensor element i. A wavelet thus arises over the wavelength axis of the spectrometer, wherein in this example two adjacent sensor elements i and i+1 detect signals having a phase difference of $\pi/2$ or 90 degrees.

If it is assumed that for example about 100 to 200 sensor elements are required for continuous detection of the distance between two layers—corresponding to two wavelets on the spectrometer line or wavelength axis, for example here assuming 120 sensor elements, 8 layers can be read simultaneously and with high reliability by means of about 1000 sensor elements. The spectral range of 500 nm to approximately 700 nm can be used in this case. An increase in the number of layers read in the visible spectral range also presupposes an increase in the spectral resolution. This necessitates the use of sufficiently strong, preferably fiber-coupled, white light sources and highly sensitive sensor elements.

Given a numerical aperture of the focus system of at least 0.5, the layer spacing should be chosen for example in such a way that, in the case of an at least approximately diffraction-limited focal spot on a layer, the associated bundle on the directly adjacent layer has at least a diameter corresponding to five to ten times the diffraction-limited focal spot.

The focal length of the focusing system can be chosen freely within wide limits. The larger the focal length is made, the lower the refractive power to be applied—for a specific depth region—by the diffraction. Therefore, it is simpler in principle to configure the focusing system with a focal length that is not excessively short. On the other hand, however, this leads to a large diameter of the focusing system and hence a large structural volume.

A storage volume of one terabyte presupposes a double-sided use of the storage disk according to the invention and a corresponding lateral extent of said storage disk, which in this case may have approximately the diameter of a standard DVD. On the other hand, the storage volume of a customary DVD can be accommodated on a volume storage disk according to the invention having a significantly smaller diameter with respect to said customary DVD.

A further aspect of the invention relates to a chromatic confocal assembly for writing for optical data storage devices, in particular terabyte volume storage devices, using reflected light or else using transmitted light, comprising at least one multi-wavelength source of electromagnetic radiation characterized in that at least one chromatic confocal component is arranged in the imaging beam path of the focusing system.

A further aspect of the present invention relates to a method for producing data storage devices, in particular terabyte data storage devices, and the use of a data storage device for storing data, in particular in the terabytes range.

In particular, this aspect of the present invention relates to the use of a data storage device for storing data, in particular in the terabytes range, by means of the interferometric confocal assembly according to the invention.

Preferably, the data storage device is written to in a plurality of layers simultaneously and/or in a large depth region in the unstructured storage volume by means of a chromatic confocal write head and/or by means of a fiber-coupled multi-wavelength laser and/or fiber-coupled and/or switchable multi-superluminescence diode light source.

According to the invention, volume storage devices can preferably be written to by means of a chromatic confocal write head with a preferably fiber-coupled multi-wavelength laser or a preferably fiber-coupled and, if appropriate, also switchable multi-superluminescence diode light source in a plurality of layers simultaneously, or else in a large depth region in the unstructured "optically burnable" storage volume. This "optical burning" is preferably effected by means of fast optical switches which adapt the spectrum of the writing radiation very rapidly in the writing operation. Optical switches may be for example filters having a variable absorption coefficient. By way of example, a filter can absorb electromagnetic radiation of a specific wavelength and the absorption coefficient can be controlled for this wavelength. As an alternative, the filter can also absorb electromagnetic radiation in a wavelength range and have, over the entire wavelength range, an absorption coefficient which can be varied rapidly, in particular. It is also possible for the filter to have different absorption coefficients for the entire wavelength range, that is to say that the filter absorbs different wavelengths differently. The individual absorption coefficients can be varied independently of one another or together with one another. This can be done for example by applying a voltage and/or by a current flow. In other words, the absorption of the filter can be controlled or regulated by applying a voltage and/or by a current flow. Optical switches can also be emitters of monochromatic electromagnetic radiation or multi-wavelength emitters. By way of example, the wavelength of the emitted electromagnetic radiation can be varied. The intensity of the emitted electromagnetic radiation can also be changed. In particular, both the wavelength and the intensity of the emitted electromagnetic radiation can be varied.

In the unstructured storage volume, it is thus possible to produce "optically burnt" dots, for example, which represent in the course of reading readily detectable micro-scatterers in a transparent, for example also inorganic, storage medium, which is highly stable over the long term.

The entire depth of the storage volume can therefore be written to in one or a plurality of operations by means of chromatic confocal technology.

Other technologies can also be used for producing optical multi-layer data storage devices, which are based for example on progressive layer-by-layer production of the volume storage device. However, the production technologies that can be used for this purpose are not of primary significance here.

BRIEF DESCRIPTION OF THE DRAWINGS

FIG. 2 shows a case where the diffractive optical zone lens has a positive refractive power.

FIG. 2a is a triple prism reflector.

FIG. 2b illustrates producing a variation of the optical path difference over the wavelength by means of diffraction at four line gratings.

DETAILED DESCRIPTION OF THE PREFERRED EMBODIMENTS

The invention is described by way of example with reference to FIGS. 1 to 4.

The representation of dots and/or pits and also reflection layers through refractive index differences which serve solely for the spatial structuring of the storage volume for one or more reference systems is dispensed with here.

Figure 1:
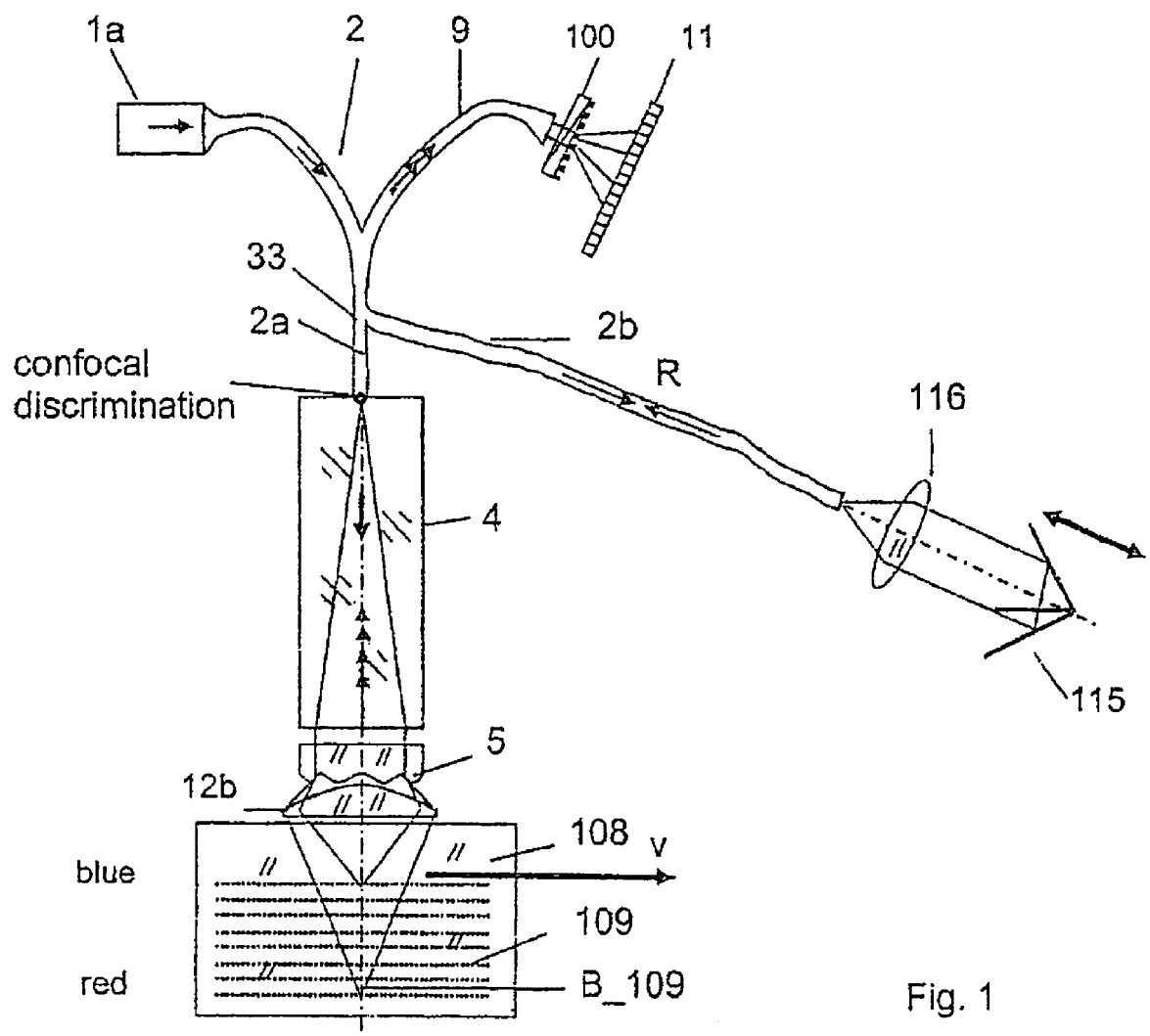
FIG. 1 is a schematic illustration of light proceeding from a comparatively strong continuum white light laser through an optical fiber and an x-coupler and via a GRIN lens for collimating the light bundle onto a diffractive optical zone lens having a negative refractive power.

Regarding FIG. 1: the light proceeding from a comparatively strong continuum white light laser 1a passes via an optical fiber 2 and an x-coupler 33, as partial light via a fiber piece 2a and via a GRIN lens for collimating the light bundle onto a diffractive optical zone lens 5 having a negative refractive power—variable as a function of the light wavelength—in the first diffraction order, such that this acts as a diverging lens. The chromatically split light passes onto a micro-objective 12b exhibiting good chromatic correction.

By virtue of the wavelength-dependent refractive power of the diffractive light-diverging zone lens 5, this leads to a longitudinal chromatic splitting for the light bundle downstream of the micro-objective 12b, here the foci of the long-wave light being furthest away from the micro-objective 12b.

The optical storage medium 108 having a multiplicity of data layers one above another, for example also having the data layer 109, is disposed downstream of the micro-objective 12b in the light direction. In this case, the optical storage medium is intended to rotate at the circumferential velocity v. For said data layer 109, too, there is precisely one light bundle B_109, which has a precisely determined wavelength and forms a sharp focus on the data layer 109. This focal spot is either at least partly reflected at the data layer 109 or extinguished by a data pit having a depression of a quarter wavelength in a known manner. In the case of reflection, the light bundle B_109 passes via the micro-objective 12b and via the diffractive optical zone lens 5, wherein the light bundle B_109 passes through the zone lens 5 precisely in the same first diffraction order as during the oncoming passage, via the GRIN lens 4 to the end of the fiber 2a, which end realizes the confocal discrimination, whereby light of the light bundle B_109 which is reflected for example at a layer lying above or below the data layer 109 is virtually completely blocked and, consequently, crosstalk is greatly reduced. The confocally discriminated light can therefore enter into the fiber 2a again. Thus, each data layer in the storage medium 108 is scanned optically in at least approximately diffraction-limited fashion and confocally discriminated by a light bundle of matching wavelength. The light thus enters into the fiber 2a in "spectral packets" since light from the region of the storage medium 108 where there is precisely no data layer, but there is also a diffraction-limited focal spot, cannot form a focus on the end of the fiber 2a and the light of this wavelength is virtually completely suppressed by the confocal discrimination. The light entering into the fiber 2a passes through the x-coupler 33 in the direction of the coupling-out fiber 9. The reference bundle R, which arises in the reference beam path in the fiber 2b after exiting from the same and collimation at the collimator 116 and after reflection at the triple-mirror reflector 115, likewise passes through the x-coupler 33 in the direction of the coupling-out fiber 9. After passing through the coupling-out fiber 9, reference light and light from the storage medium 108 pass onto a highly sensitive fiber-coupled spectrometer 100—the associated imaging optical arrangement of the spectrometer has not been illustrated here—and onto a highly sensitive CMOS line camera 11 and attain interference there. The spectrum of the interfering light is evaluated there. The evaluation takes place by determining the magnitude of the signal amplitude of the wavelet in the simplest possible manner since the frequency of the wavelet is at least approximately known. In the simplest case, this can be done by the evaluation of some sensor elements which scan the wavelet in such a way that signal values shifted by a quarter of a period are respectively detected. The logic 1 or the logic 0 are determined from the magnitude of the signal amplitude of the wavelet by means of a sliding trigger threshold. The sliding trigger threshold takes account of the complex situation of the signal origination, for example also the depth of the layer and hence also the light losses that occur.

In this case, the optical path difference in the fiber-coupled interferometer is tuned by means of the triple-mirror reflector 115 in such a way that it is only at most a few 100 μm, but is not 0. On the other hand, the evaluation can also be effected by means of a fast Fourier transformation (FFT) of the wavelet.

When the layer packet to be read changes, the CMOS line camera 11 can also be shifted laterally in order that it does not have to be formed with an excessive length.

Regarding FIG. 2: in this case, the diffractive optical zone lens 55 is formed with a positive refractive power—variable as a function of the light wavelength—in the first diffraction order, such that it acts as a converging lens. Thus, the longer-wave light forms the foci at the minimum distance from the micro-objective 12b exhibiting good chromatic correction. A dispersion plate 117 is arranged in the collimated beam path in the reference arm of the interferometer, the optical thickness of said dispersion plate increasing owing to the larger refractive index of the plate material with shorter wavelength. This can be used for the targeted influencing of the optical path difference depending on the wavelength in the interferometer. This affords the possibility of influencing the frequency of the wavelets over the wavelength in a targeted manner and thus of considerably reducing the undesirably large increase in the frequency of the wavelets in the direction of shorter wavelengths. FIG. 2a illustrates a triple-prism reflector, which is thus dispersive in order to enable a dependence of the optical path difference on the wavelength.

FIG. 2b illustrates the possibility of producing a variation of the optical path difference over the wavelength by means of diffraction at four line gratings 118, which are formed as phase gratings positioned parallel to one another and here perpendicular to the optical axis, here the longer-wave light having the larger optical path difference. The diffractive optical zone lens 5 can thus be formed with negative refractive power, whereby the foci of the longer-wave light are at the larger distance from the system and therefore also have the larger optical path difference in the case of interference. Said larger optical path difference can be at least partly compensated for by means of the grating arrangement, comprising four line gratings 118.

Figure 3:
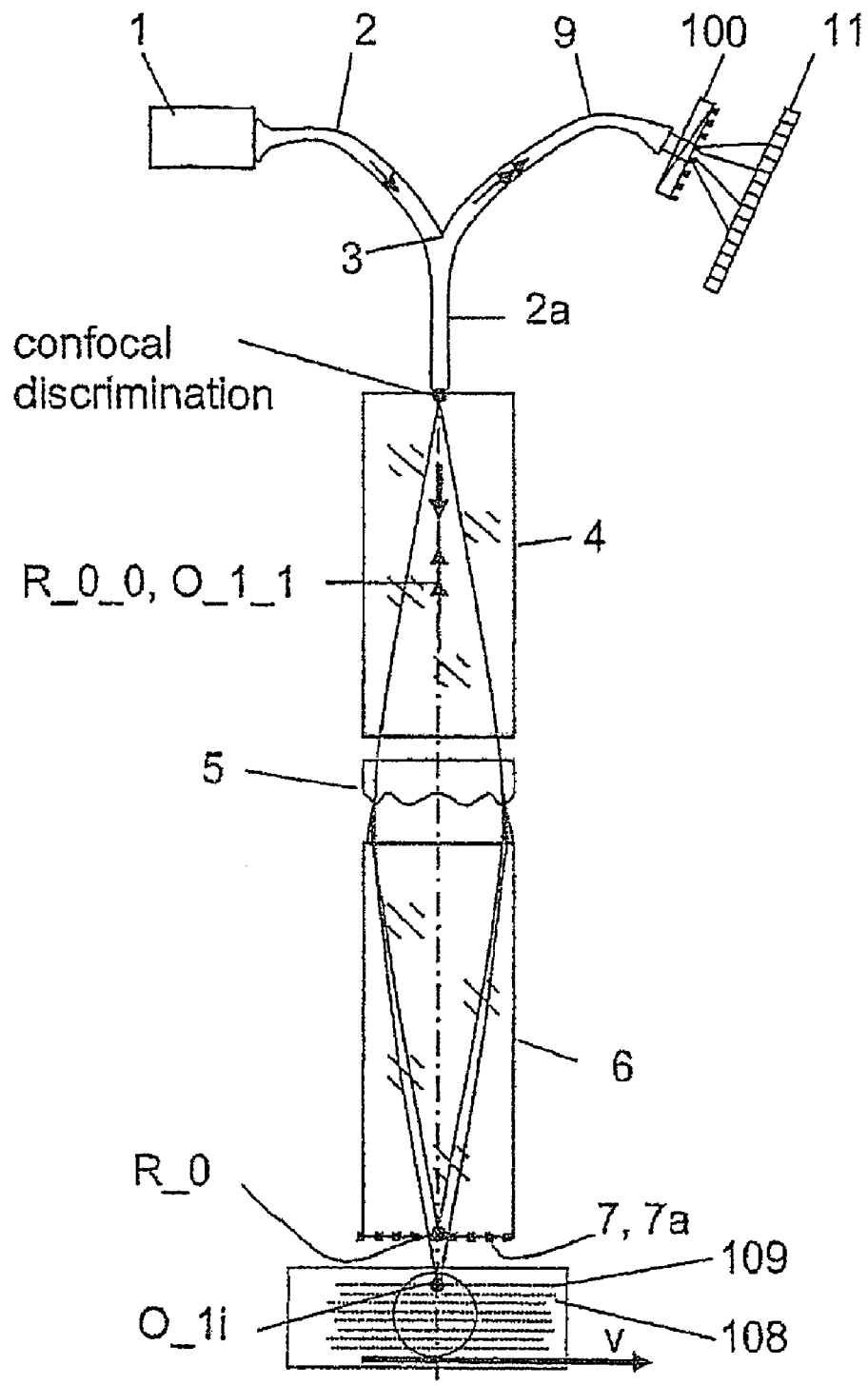
FIG. 3 shows light proceeding from a white light source passing via an optical fiber and a y-separator and via a fiber piece via a GRIN lens for collimating the light bundle onto a diffractive optical zone lens having a negative refractive power.

Regarding FIG. 3: the light proceeding from a white light source 1 passes via an optical fiber 2 and a y-separator 3 and via a fiber piece 2a via a GRIN lens 4 for collimating the light bundle onto a diffractive optical zone lens 5 having negative refractive power that is variable as a function of the light wavelength, such that said lens acts as diverging lens.

The light bundle is split at the diffractive optical zone lens 5 in the zeroth diffraction order into a reference beam bundle R and in the first diffraction order into a plurality of weakly diverging object beam bundles, thus also into an object beam bundle O_1i. In this case, the geometric-optical construction of the downstream GRIN lens 6 is coordinated in such a way that the front face 7 of the GRIN lens 6, which acts as reference partial mirror with beam splitter layer 7a, lies at the focus of the bundle of the zeroth diffraction order of the diffractive optical zone lens 5. The partial light bundle reflected at the beam splitter layer 7a at the front face 7 serves as reference bundle R. The partial light bundle O_1i passing through the diffractive optical zone lens 5 in the 1st diffraction order passes through the front face 7 of the GRIN lens 6, representing the reference mirror area, and passes into the storage medium 108. By virtue of the refractive-power-variable effect of the diffractive optical zone lens 5, the object beam bundle is focused in different depths of the storage medium 108 depending on the light wavelength. There is therefore a longitudinal chromatic aberration or longitudinal chromatic splitting. The light reflected back by the data layer 109 from the storage medium 108 once again passes through the GRIN lens 6 together with the reference bundle R and once again passes through the diffractive optical zone lens 5 in the same diffraction order as in the oncoming route and becomes the object beam bundle O_1_1i. The light focused at the front face 7 acting as reference mirror area is partly reflected and once again passes through the diffractive optical zone lens 5 in the zeroth diffraction order and becomes the reference beam bundle R_0_0. Thus, for the layer 109 there are two interfering bundles O_1_1i and R_0_0, which are focused again onto the end of the monomode fiber 2 by means of GRIN lens 4 and enter into said monomode fiber 2, wherein a confocal discrimination takes place here in particular for the object beam bundle O_1_μl. After passing through the y-separator 3, the interfering light passes via the coupling-out fiber 9 onto a spectrometer 100 onto a highly sensitive CMOS line camera 11, which registers the resulting spectrum. In this case, the spectrum is modulated over the wave number—depending on the conditions for constructive and destructive interference as a function of the wavelength and the optical path difference at the object point—and forms a wavelet over the wave number.

Given a fixed optical path difference Δx, the signal arising on the line camera 11 can be calculated as a function of the wavelength λi by means of subsequent equation (4) with the modulation m:

$$I(\lambda_I) = I_{Ref} + I_{Obj}(\lambda_i) + 2\sqrt{I_{Ref} \cdot I_{Obj}(\lambda_i)} \cdot m \cdot \cos\left(2\pi \cdot \frac{\Delta x}{\lambda_I} + \varphi_0\right). \quad (4)$$

The value Δx denotes the path difference of the interfering wave packets which originate from the zeroth order and the first order, wherein the path difference Δx may depend somewhat on the wavelength owing to the dispersion of the storage medium.

The influence of the confocal diaphragm on the signal is determined by means of subsequent formula (5):

$$I = \frac{\sin\left(\frac{u}{2}\right)}{\frac{u}{2}} \text{ where } u = \frac{2\pi}{\lambda} NA^2 z(\lambda) \quad (5)$$

The numerical aperture of the light cone at the object point is designated by NA, and z indicates the depth.

With this assembly, the presence of a data pit can be identified with high reliability by determining by evaluation of the spectrum whether a wavelet or no wavelet has arisen, where no wavelet signifies the existence of a data pit.

In the spectrometer 100, the spectral resolution should be chosen at least to be high enough that the spectral interval or wavelength increment Δλ at the wavelength λ that is covered by an element of the line camera 11 is small enough in order that the coherence length l, $l=\lambda^2/\Delta\lambda$, is greater than the optical path difference Δx in the interferometer in order that interference can occur. Said optical path difference Δx has a value up to hundreds of μm and can be chosen to be larger or smaller depending on the spectral resolution and photometric sensitivity of the spectrometer used.

Figure 4:
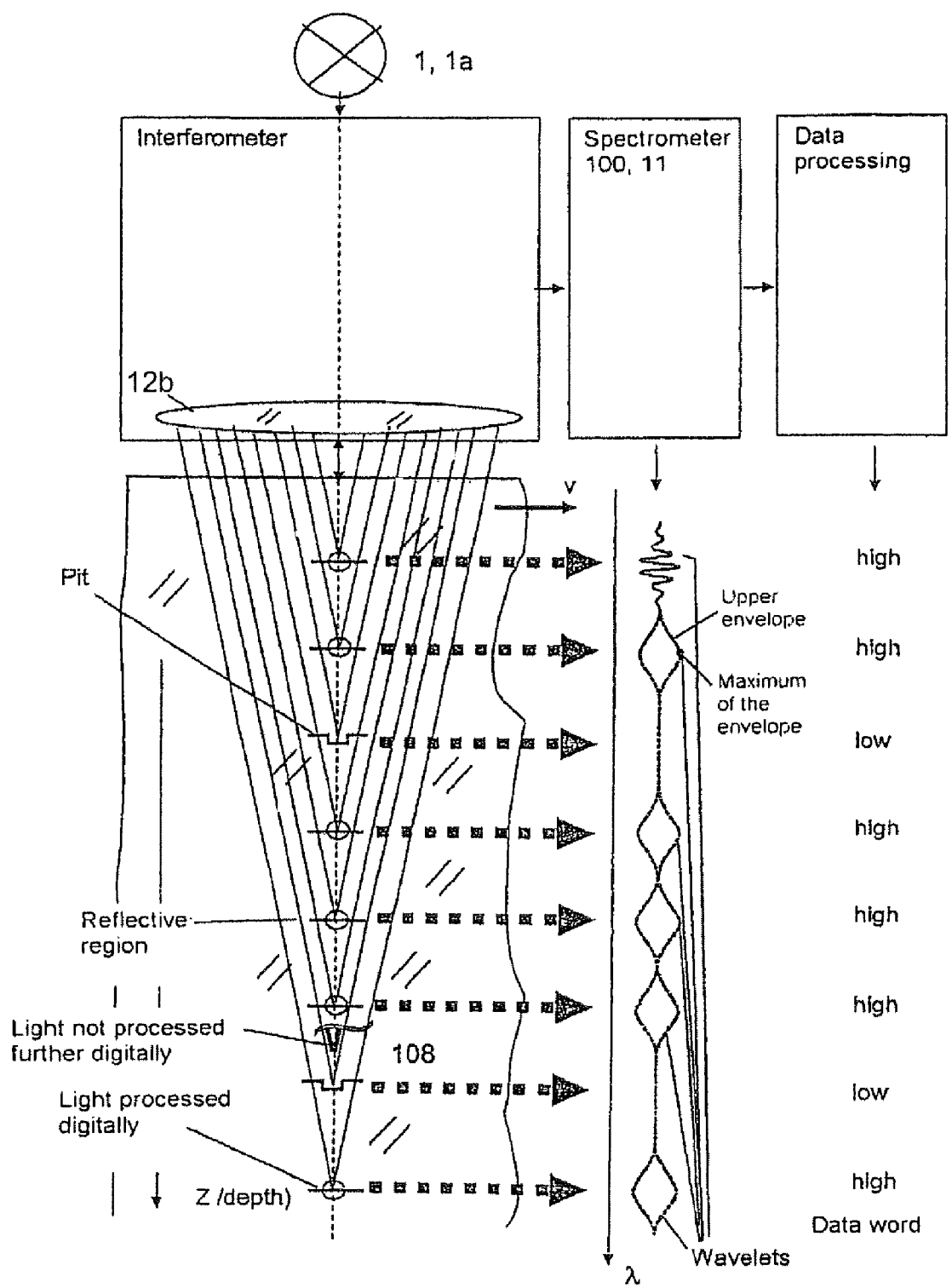
FIG. 4 illustrates the principle of the interferometric confocal assembly and the interferometric confocal method with integrated chromatic confocal depth splitting.

FIG. 4 illustrates the principle of the interferometric confocal assembly according to the invention and of the interferometric confocal method according to the invention with integrated chromatic confocal depth splitting. The interferometer, the objective 12b and also the storage medium are illustrated. On the spectrometer axis, that is to say the λ axis, the wavelets arise with an upper envelope when reflective regions are present in the storage volume 108. When a pit is present, no wavelet or a very weak wavelet arises. Said envelope in each case has a maximum here. The desired digital information items, here in each case the logic values 0 and 1, are obtained from the wavelets on the spectrometer axis by means of a data processing unit.

In this case, it is important that light of the wavelength is always identified, that is to say the wavelength is determined, which light forms a sharp focus in the region of the physical-optical depth of focus that symmetrically encloses a data layer. Only light of this wavelength can supply a logic zero with high reliability.

Thus, in the scanning system there is light of specific wavelengths which is currently being processed further digitally, that is to say "light processed further digitally", and light of specific wavelengths which is currently not being processed further at a given point in time, that is to say "light not processed further digitally".

In this case, the transition from the "light processed further digitally" to the "light not processed further digitally" can be produced very rapidly by vibrations. The trend can be followed by means of permanently determining the amplitudes of the wavelets in the vicinity of "light processed further digitally", that is to say in the direct vicinity on the spectrometer axis. The greatest dependability is obtained, however, by constantly determining the amplitudes of all the wavelets, that is to say always evaluating all the sensor elements of a spectrometer line.

The distance between the individual data layers should be chosen such that light which is sharply focused onto a data layer does not bring significantly more reflected light from a directly adjacent data layer through the confocal diaphragm, for example here a fiber end, than would return from a a λ/4 pit on which a sharp focus is situated. After all, a λ/4 pit produces the extinction of the light radiated in. It should always be taken into account that the light from the storage volume is practically "amplified" after the confocal discrimination by means of interference. As a result of the high spectral splitting, the coherence length becomes relatively large, which can therefore also enable coherent disturbances. However, the application of the interference also makes up the high sensitivity of the method and thereby also affords the possibility of reading more than 100 layers lying one above another in a volume.

The invention claimed is:

1. An interferometric confocal method for writing to and/or reading from terabyte volume optical data storage devices, comprising:
   radiating electromagnetic radiation from at least one multi-wavelength source (1, 1a) onto a terabyte volume optical data storage device; and
   imaging reflected or transmitted electromagnetic radiation of an interior of the terabyte volume optical data storage device onto a screened receiver (11), after the electromagnetic radiation has passed through a two-beam interferometer, a chromatic confocal microscope and a spectrometer,
   wherein the spectrometer (100) is disposed upstream of the screened receiver (11), and the two-beam interferometer works with an optical path difference not equal to zero, and in the case of a reflective region in the terabyte volume optical storage device (108), at least one wavelet is generated over a spectral axis of the spectrometer (100).

2. The interferometric confocal method for terabyte volume storage devices, as claimed in claim 1, characterized in that forming foci by longitudinal chromatic aberration, or chromatic depth splitting, at different depths of the terabyte volume optical data storage device (108), wherein a spherical aberration is made to a minimum for each focus of any desired wavelength in a spectral range used.

3. The interferometric confocal method for terabyte volume storage devices, as claimed in claim 1, characterized in that evaluating each at least one wavelet on the spectrometer axis with logical scanning windows which are formed from sensor elements of the spectrometer and electronically tracking, in the read-out operation for wavelets jumping or drifting on the spectral axis, the logical scanning windows to said each at least one wavelet in highly dynamic fashion.

4. The interferometric confocal method for terabyte volume storage devices, as claimed in claim 1, characterized in that a signal amplitude of the at least one wavelet is evaluated in order to obtain digital data.

5. The interferometric confocal method for terabyte volume storage devices, as claimed in claim 1, characterized in that in at least one arm of the two-beam interferometer, by dispersion and/or diffraction, the optical path difference is made wavelength-dependent in a predetermined manner in order to influence a center frequency of the generated at least one wavelet.

6. An interferometric confocal assembly for writing and/or reading for terabyte volume optical data storage devices using reflected light or else using transmitted light, comprising:
   an interferometer having a imaging beam path and a reference beam path,
   at least one multi-wavelength source (1, 1a) of electromagnetic radiation,
   a focusing system for microscopic imaging of an interior of a terabyte volume optical data storage device, which is arranged in the interferometric imaging beam path, onto a screened receiver (11) of electromagnetic radiation, wherein:
   the interferometer is coupled to a chromatic confocal assembly in the imaging beam path of the focusing system, a spectrometer (100) is disposed upstream of the screened receiver (11) and no chromatic confocal components are arranged in the reference beam path.

7. The interferometric confocal assembly as claimed in claim 6, wherein the assembly is designed such that the interferometer works with an optical path difference not equal to zero.

8. The interferometric confocal assembly as claimed in claim 6, wherein the arrangement is designed such that in the case of a reflective region in the terabyte volume optical data storage device, at least one wavelet is generated over a spectral axis of the spectrometer.

9. The interferometric confocal assembly for optical data storage devices, as claimed in claim 6, characterized in that the interferometer is formed as a two-beam interferometer.

10. The interferometric confocal assembly for optical data storage devices, as claimed in claim 6, characterized in that at least one diffractive optical zone lens (5, 55) is arranged in the focusing system.

11. The interferometric confocal assembly for optical data storage devices, as claimed in claim 6, characterized in that the diffractive optical zone lens (5, 55) is arranged in a pupil of the focusing system situated in the Fourier plane of a focusing objective (6, 12, 12b), wherein the focusing objective is arranged in the interferometric imaging beam path.

12. The interferometric confocal assembly for optical data storage devices, as claimed in claim 11, characterized in that the interferometer is formed as fiber-coupled interferometer.

13. The interferometric confocal assembly for optical data storage devices, as claimed in claim 11, characterized in that the interferometer is a Linnik interferometer or Mach-Zehnder interferometer.

14. The interferometric confocal assembly for optical data storage devices, as claimed in claim 11, characterized in that the interferometer is formed as a common-path interferometer.

15. The interferometric confocal assembly for optical data storage devices, as claimed in claim 14, characterized in that the interferometer is a Mirau interferometer.

16. The interferometric confocal assembly for optical data storage devices, as claimed in claim 14, characterized in that the interferometer is a Fizau interferometer.

17. The interferometric confocal assembly for optical data storage devices, as claimed in claim 8, characterized in that at least one fiber-coupled line spectrometer (100, 11) is disposed downstream of the interferometer.

18. The interferometric confocal assembly for optical data storage devices, as claimed in claim 8, characterized in that a retroreflector is formed such that it is regulated sensitively in terms of its axial position in the reference beam path of the interferometer in order always to set the optical path difference in the interferometer to be a value different from zero with respect to a depth of layers of a selected packet, wherein the layer packet includes at least selected two layers of the terabyte volume optical data storage device.

19. The interferometric confocal assembly for optical data storage devices, as claimed in claim 18, characterized in that the retroreflector is a triple-mirror reflector (116).

20. The interferometric confocal assembly for optical data storage devices, as claimed in claim 19, characterized in that a diffraction module with gratings is arranged in the reference beam path.

21. The interferometric confocal assembly for optical data storage devices, as claimed in claim 20, characterized in that the diffraction module is constructed with two or four structurally identical phase gratings (118) which are all arranged parallel to one another.

22. The interferometric confocal assembly for optical data storage devices, as claimed in claim 21, characterized in that the phase gratings (118) are formed as phase-mostly SLMs and are formed such that they are controlled electronically in terms of their grating parameters.

23. The interferometric confocal assembly for optical data storage devices, as claimed in claim 8, characterized in that at least one optical element is arranged in the reference beam path, wherein the at least one optical element is formed with dispersive material.

24. The interferometric confocal assembly for optical data storage devices, as claimed in claim 13, characterized in that the optical element with dispersive material in the reference beam path is formed as a plane-parallel plate (117).

* * * * *